March 12, 1963  M. W. THOMPSON ET AL  3,080,976
FILTER CARTRIDGE SYSTEM FOR CORROSIVE FLUIDS
Filed Feb. 17, 1960  4 Sheets-Sheet 1

INVENTORS
M. W. THOMPSON
D. C. THOMPSON
BY
ATTORNEY

INVENTORS
M. W. THOMPSON
D. C. THOMPSON
BY
ATTORNEY

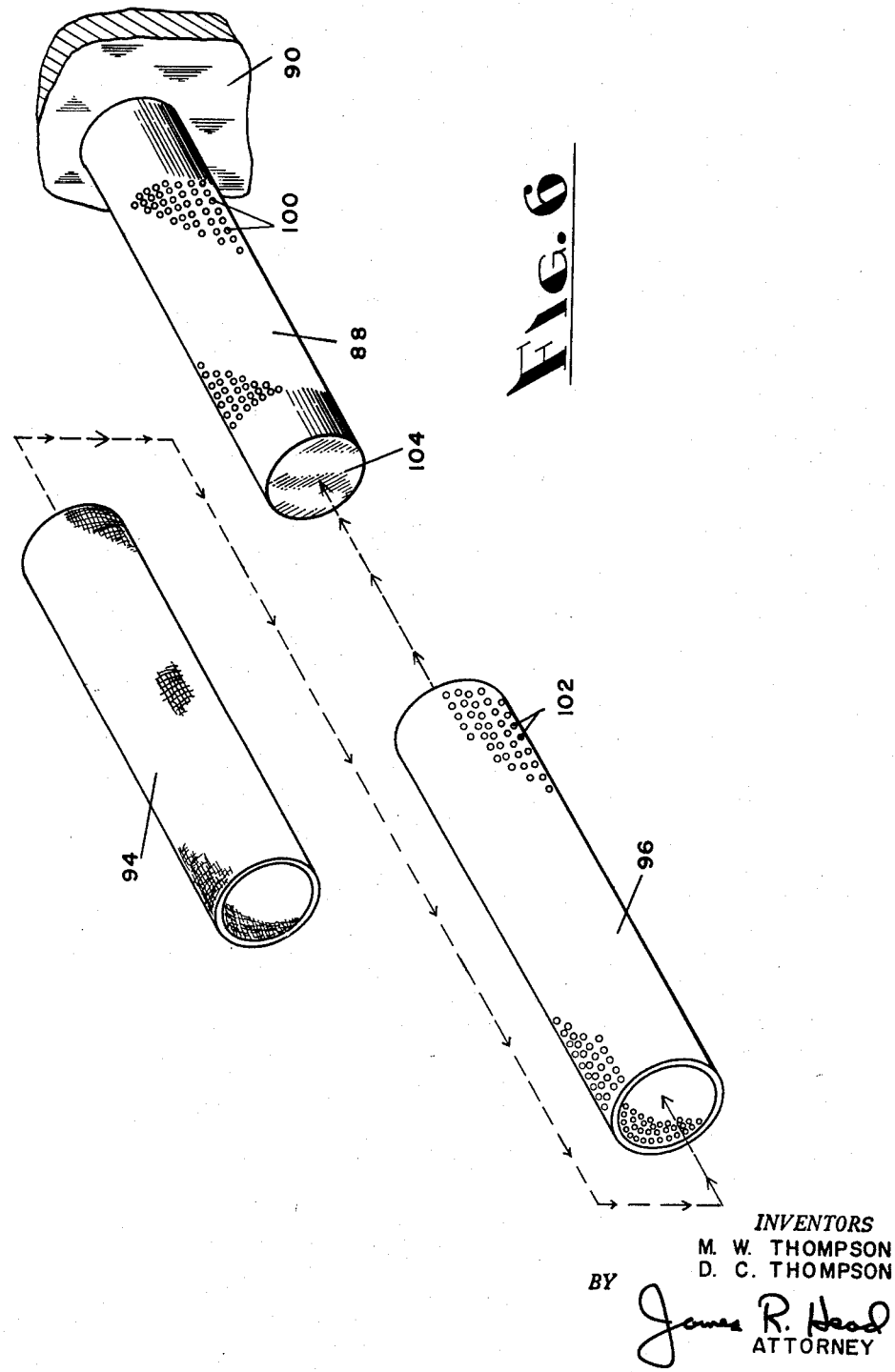

United States Patent Office 3,080,976
Patented Mar. 12, 1963

3,080,976
FILTER CARTRIDGE SYSTEM FOR CORROSIVE FLUIDS
Malcolm W. Thompson, Tulsa, and Don C. Thompson, Sapulpa, Okla., assignors to Southwest Filter Company, Tulsa, Okla., a corporation of Oklahoma
Filed Feb. 17, 1960, Ser. No. 9,230
1 Claim. (Cl. 210—232)

This invention relates to apparatus for filtering fluids. More particularly, it relates to the micronic filtration of solids, liquid-liquid separation apparatuses, and/or coalescing of fluids where corrosive or high temperature conditions exist.

In the art of filtering, separation and coalescing of fluids the use of mineral wool fibers has become common and highly desirable. As a generic class this includes fibers formed of rock, slag, glass, mixtures thereof and other similar raw materials. Filter elements of such fibrous material are typically constructed in one or more layers, mixed with a set or hardened binder, such as asphalt, or resins, such as phenolic resins, drying oils, and the like, which are interspersed throughout the fibrous mat to maintain a bonded and relatively rigid filter element. In many instances the layers of filter material and binder are compressibly forced into a compact mass having mechanical stability for attachment to perforated filter supporting devices. The size of the pore space and voids is substantially controlled by the degree of compression to which the filter elements are subjected. After the resinous bonding agent has set and the compressed mass cooled, the resulting filter element is ready for use. Elements have been perfected capable of separating minute solids, for example, within the range between 0 to 4 microns.

Although the use of such fibrous filter elements has considerable utility and economy, certain difficulties arise when used to filter, separate, and coalesce corrosive fluids. It appears that corrosive liquids react with the usual bonding agents caused to make up the filter, depreciating its mechanical strength and filtering ability. In addition, removal of the element for replacement becomes difficult. At best, the filter element is a mat of loosely held fibrous elements.

Accordingly, it is an object of this invention to provide a filtering, separating, and coalescing system using mineral wool fibers which will overcome the problems heretofore associated with their use, particularly with corrosive and high temperature fluids.

Another object of this invention is to provide a filtering system for removal of minutely small solid particles from corrosive and high temperature fluids.

A further object of this invention is to provide a filter element design which is particularly adaptable to filtering, separating, and coalescing of corrosive liquids, which is easily replaced, economical, and yet retains high mechanical strength and filtering conditions for long periods of time.

A still further object of this invention is to provide a filter cartridge system for particular use with mineral wool fibrous materials, which is adaptable to inside-outside flow conditions and yet maintain proper filtering strength and porosity.

A yet further object of this invention is to provide a filter cartridge system using mineral wool fiber filtering elements for use with outside-inside flow conditions.

A further important object of this invention is to provide a filtering system which combines in stage operation the separation of solids and coalescing of corrosive and high temperature liquids in one unit.

A yet further object of this invention is to provide a filter cartridge system wherein the support container can be used over and over, with replacements of the filter element.

Briefly, this invention refers to the use of a bonded mineral wool fibers, such as glass wool fibers for micronic filtration, separation and/or coalescing. The filter cartridge element includes what might be termed a support can having non-corrosive inside and outside perforated metallic members between which is sandwiched a glass wool filter formed with resinous bonding agents and highly compressed for filtration and/or coalescing of minutely small particles. The outside portion of the container is adapted for removal therefrom when the filter cartridge element becomes spent. This removal includes a lip which is adapted to remove the filter element therefrom with a minimum of effort. Cartridges designed for inside-outside and outside-inside flow or combinations thereof conditions are described.

Further objects of this invention will become apparent upon reading of the specification and claims when taken in conjunction with the following illustrations of which:

FIGURE 6 is an exploded view of the assembly constructed according to FIGURE 5.

Figure 1:
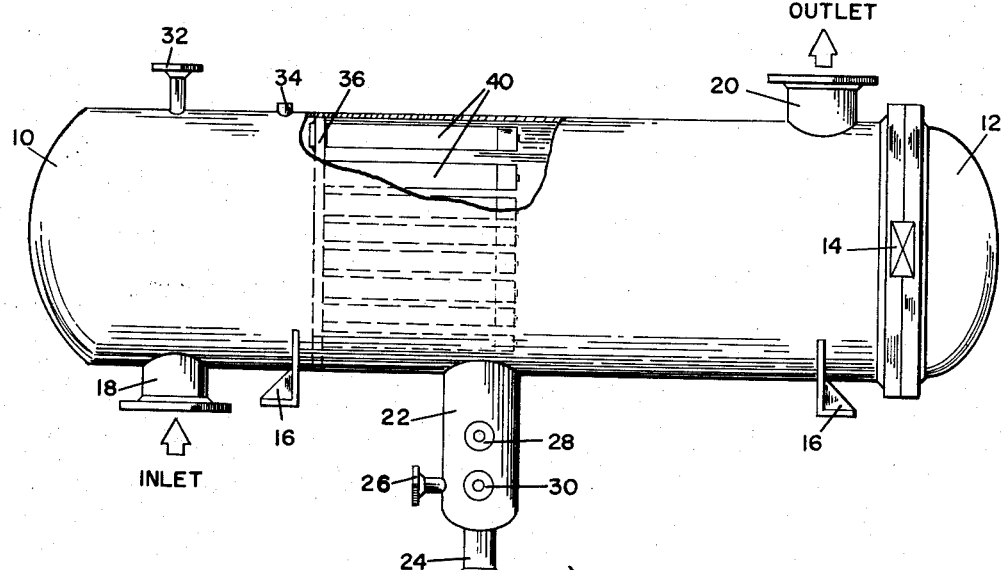
FIGURE 1 is a side elevational view partly in cross-section of a separator and coalescing unit where flow conditions are inside to outside the filter cartridges.
Figure 2:
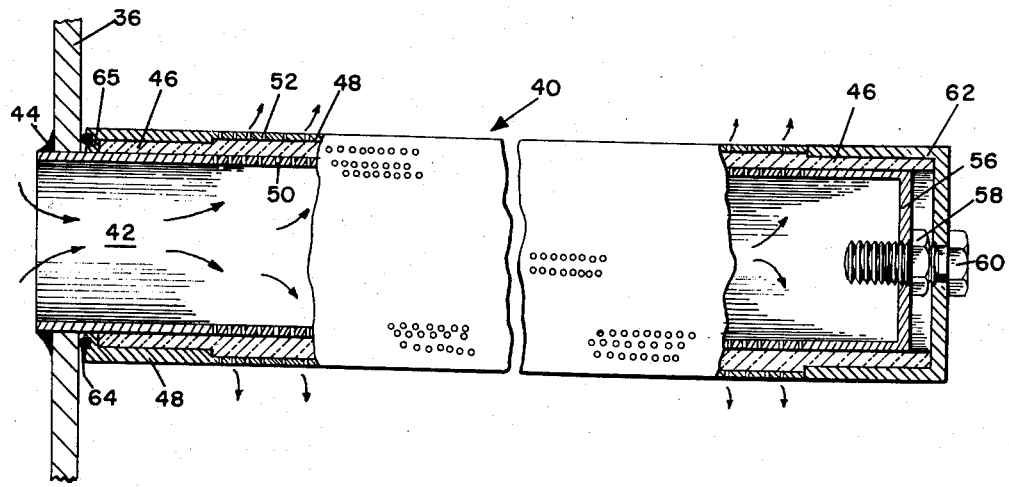
FIGURE 2 is an enlarged cross-section view of an individual filter cartridge unit constructed according to this invention.
Figure 3:
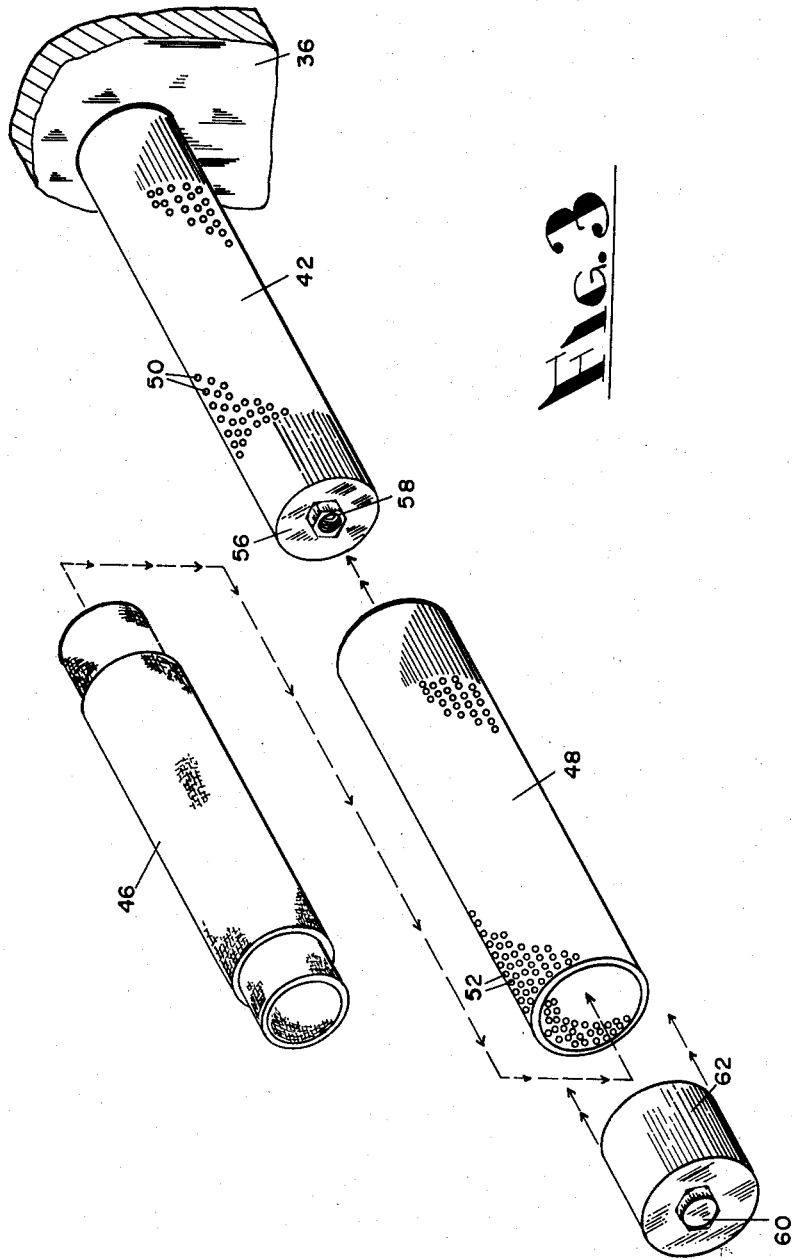
FIGURE 3 is an exploded view of the assembly shown in FIGURE 2.

Referring now to the drawings in detail, and particularly the apparatus described in FIGURES 1, 2, and 3, reference numeral 10 designates a typical filtering, separating and coalescing unit typically of a cylindrical shell with at least one removable end closure member 12 (manhole cover) for removable and replacement of filter cartridges. In the apparatus shown, cover 12 is a full face flange, adapted for movement about hinge 14, however, other types of non-circular flange openings may be used such as quick release elliptical manway flanges and the like. Cylindrical shell 10 is typically supported in a horizontal position by vertical ground supports, not shown, which connect to elements 16. An inlet conduit 18 is adapted to be connected to the flow line system (not shown) containing fluids to be filtered, separated or coalesced. An outlet conduit 20 is provided diametrically opposite inlet 18 and adaptable for connection with a flow line to carry the filtrate. An accumulator sump such as water leg 22 and outlet 24 therefrom is typically provided as shown between the inlet 18 and outlet 20. Other connections 26, 28, and 30 are adaptable for automatic dump valve systems and/or liquid level gauging apparatus. Relief valve connection 32 and air vent 34 is provided for other auxiliary and safety equipment.

The interior of the cylindrical shell 10 is provided with a circular holding plate 36 adapted to be welded or rigidly and sealingly affixed to block passage of fluids from inlet 18 to outlets 20 and 24 and cause the fluid to be channeled through a multiplicity of filter cartridges 40 as more specifically illustrated in FIGURES 2 and 3.

The filter cartridge element 40 comprises three basic parts. A metallic, non-corrosive tubular inner conduit 42 is attached to holding plate 36 at weld 44. Concentric and in snug engagement therewith is a bonded mineral wool filter element 46. A removable outer metallic cylindrical member 48 retains the element 46 substantially in the position shown. In the instance where a filter cartridge system as above described is used, typically, in coalescing of liquids, the inner tubular element 42 and outer element 48 have a multiplicity of perforations 50 and 52 respectively. These perforations begin up to several inches away from the holding plate 36 in order to force the liquid into the cartridge and prevent bypass. Since flow conditions are from a high velocity to a low velocity, i.e., inside to outside, provision is made for maintaining the filter cartridge system in its assembled relationship. Inner tubular member 42 is closed at free end 56 with a threaded nut-like means 58, adaptable to receive bolt 60. Cylindrical cap 62 thus retains filter cartridge 46 and outer tubular member 48 into rigid relationship with holding plate 36 and inner conduit 42. An O-ring seal 64 is provided as a type of gasket to prevent bypass of fluids and relieve stress. It is recognized that under some corrosive or high temperature conditions other types of gasket and packing may be used instead of the O-ring. A lip or extension portion 65 is formed as a part of outer member 48. This portion functions to retain the cartridge 46 in a fixed position and assist removal when spent.

Figure 4:
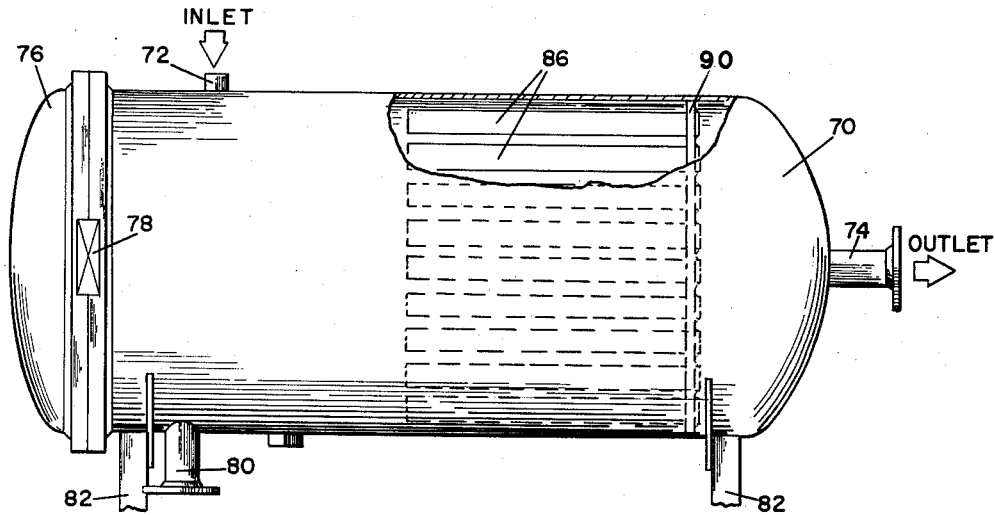
FIGURE 4 is an elevational view of an apparatus constructed according to this invention for typical use in separating and filtering solids from corrosive liquids where flow conditions are from outside to inside.
Figure 5:
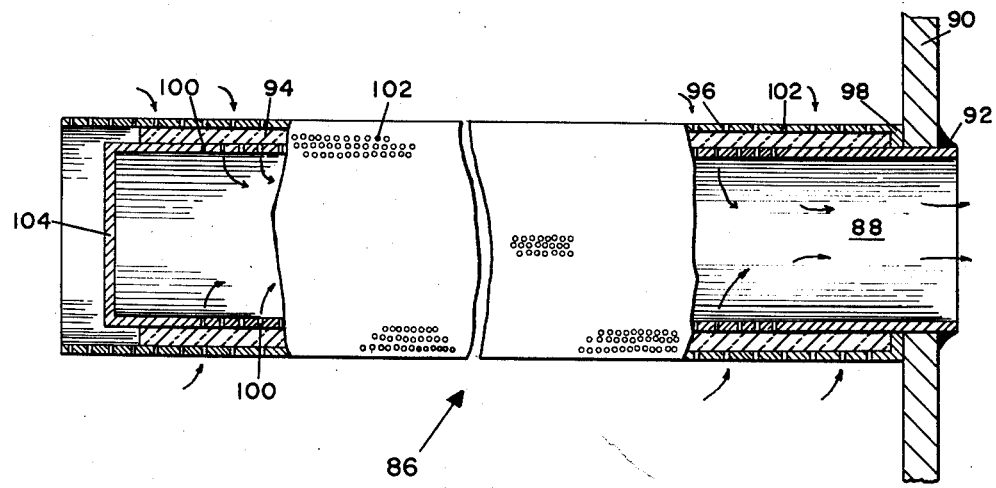
FIGURE 5 is a cross-sectional view of the cartridge assembly for use where flow conditions are from outside to inside constructed in accordance with this invention.

Referring now to FIGURES 4, 5, and 6, apparatus is described for particular use in filtering solids from corrosive fluids. Similar to FIGURE 1, a cylindrical shell means 70 is provided with an inlet 72 for fluids to be filtered and an outlet 74 for filtrate material. An end closure or manhole cover 76 is adapted for movement about a hinge connection 78 for replacement and removal of the interior filter cartridge units. An outlet conduit 80 is provided for removal of solids material filtered from the inlet fluids. The cylindrical shell 70 is normally in a horizontal position as shown, held by vertical supports 82. Interiorly of the shell 70 is a holding plate 90 adapted to restrict flow from inlet 80 to outlet 74 except through filter cartridge elements 86 which are more adequately illustrated in FIGURES 5 and 6.

Similar to the cartridge element described in FIGURES 2 and 3, the element herein includes an inner tubular member 88 rigidly affixed to holding plate 90, by weld 92. A cylindrical filter element 94 is sandwiched between inner tubular element 88 and outer element 96. Element 96 includes an extension flange or lip 98 having an opening approximately that of the outside diameter of tubular element 88 and adapted to move laterally along the outside diameter therewith as needed for replacement of filter elements 94. Like the portion 65 of FIGURE 2, the flange or lip 98 is adapted to retain the filter element, yet facilitate its removal when spent. The inner tubular element includes perforations 100 preferably beginning several inches from each end as illustrated in order to assist flow through the cartridge. The outer tubular element 96 is perforated substantially throughout its length as indicated by the numeral 102. Inner tubular element 88 is closed at end 104 such that flow conditions existing in the direction of the arrows will be forced to pass through the filter element 94.

The apparatus of FIGURES 4, 5, and 6 are adapted to low velocity to high velocity flow conditions, i.e., outside to inside. Accordingly, this eliminates the necessity for a locking cap to maintain the parts in their assembled condition.

An important feature of this invention is the provision of interior flange or lip portions 65 of the apparatus of FIGURE 2 and 98 in the apparatus of FIGURE 5. This lip becomes important in the removal of a spent filter element where corrosive like fluids have tended to destroy the bonding agent used with mineral wool filter elements. Initially, the filter element such as glass wool comprises a relatively rigid mass of material. However, after extended periods in a corrosive atmosphere the bonding agent is destroyed, leaving a non-rigid mass of glass fibers which has heretofore been difficult to remove for replacement with a new cartridge.

Obviously, since the filtering conditions for particular use herein requires that the materials be of a non-corrosive nature, elements other than the filter element itself are preferably composed of stainless steel. Although the device as herein described is capable of use in filtering, separating and coalescing many fluids, it has particular application and success with corrosive fluids which normally tend to destroy the phenolic bonding agents such as are used with glass wool filter elements.

The apparatus as herein described has been successful in recovering valuable platinum catalyst fines such as exist in the particle size range of 0 to .25 micron. The catalyst becomes entrained in nitric acid solutions used in the manufacture of ammonium nitrate fertilizer when passed through a flluidized bed of the catalyst. Before using a filter system constructed according to this invention losses ranged up to 50 ounces of catalyst in one year period. In the same period using the filter of this invention negligible losses were reported.

Although the invention has been described with reference to specific and preferred embodiments it will be apparent, however, that many modifications can be made without departing from the spirit of the invention. For example, although I have described the apparatus of FIGURES 1, 2, and 3 as specifically useful in coalescing liquids, in some processes it has been found successful for separating or filtering solids. Similarly, the apparatus of FIGURES 4, 5, and 6 may have particular utility in coalescing certain liquids in addition to their solids removal ability. In some instances a two stage filtering and coalescing system is combined into a single unitary shell as the need arises. In other instances one or more stages of the same filter cartridge elements or of the other may be necessary. Accordingly, this invention should be construed not to be limited to the embodiment herein described, but should be limited only by the scope of the appended claims.

We claim:

A filter cartridge system for corrosive and high temperature conditions comprising an inner tubular conduit closed at one end and attached to a filter holding plate at the other end to permit fluid flow across said plate, said inner conduit having minute perforations between non-perforated portions from each of said ends, an outer member spaced from said inner conduit by an attached inward projecting extension at that end to be adjacent said plate, said extension encircling said inner conduit and telescopic along its length, a packing ring engagable between said extension and said holding plate when positioned on said inner conduit, a perforated portion in said outer member substantially opposite said perforations in said inner conduit when assembled, said perforated portion of slightly larger inside diameter than the remaining portion of said outer member, a bonded filter element substantially filling the space between said inner conduit and said outer member and removably attachable with said outer member, cap means removably attached to said inner conduit to retain said cartridge system together during flow conditions.

References Cited in the file of this patent

UNITED STATES PATENTS

| | | |
|---|---|---|
| 619,569 | Hewel | Feb. 14, 1899 |
| 2,464,036 | Hasselwander | Mar. 8, 1948 |
| 2,911,101 | Robinson | Nov. 3, 1959 |

FOREIGN PATENTS

| | | |
|---|---|---|
| 13,128 of 1899 | Great Britain | May 19, 1900 |
| 374,068 | France | Apr. 8, 1907 |